United States Patent Office 3,347,880
Patented Oct. 17, 1967

3,347,880
17α-HALOGENOETHINYLESTRANES
Cecil H. Robinson, Cedar Grove, N.J., assignor to Schering Corporation, Bloomfield, N.J., a corporation of New Jersey
No Drawing. Filed Oct. 5, 1962, Ser. No. 228,748
19 Claims. (Cl. 260—397.5)

This invention relates to a new class of steroids, to processes for their preparation and to novel intermediates produced thereby. More particularly, this invention relates to therapeutically valuable steroids of the estrane series having a 17α-halogenoethinyl group. Specifically, this invention relates to 17α-halogenoethinylestradiol, 16,16-difluoro-17α-halogenoethinylestradiol, and to derivatives thereof and to methods for their preparation.

Included among the novel steroids of this invention are 17α-halogenoethinylestranes of the following general formula:

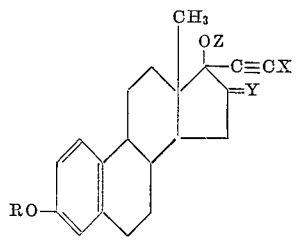

wherein R is a member of the group consisting of H, lower alkyl, and an acid radical of a hydrocarbon carboxylic acid having up to 8 carbon atoms; X is a halogen having an atomic weight greater than 19 and less than 100; Y is a member of the group consisting of

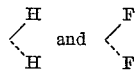

and Z is a member of the group consisting of H and an acid radical of a hydrocarbon carboxylic acid having up to 8 carbon atoms.

By lower alkyl is contemplated hydrocarbon radicals having up to 8 carbon atoms, thus including radicals such as methyl, ethyl, propyl, ter-butyl, hexyl, octyl, and the like.

The acid radicals at C–3 and C–17 of the compounds of this invention are preferably from lower alkanoic acids such as acetic, propionic, butyric, valeric, caproic, enanthic, and the like. Also included are acid radicals of aryl carboxylic acids such as benzoic and of dibasic acids such as succinic.

Thus, included in this invention are compounds such as 17α-chloroethinylestradiol (17α-chloroethinyl - 1,3,5 (10)-estratrine-3,17β-diol), 16,16-difluoro - 17α - chloroethinylestradiol (16,16-difluoro-17α-chloroethinyl - 1,3,5 (10)-estratrine-3,17β - diol), 17α - bromoethinylestradiol, 16,16-difluoro-17α-bromoethinylestradiol, the 3-methyl ether derivatives thereof, the 3-methoxy-17-acetate derivatives thereof, the 3-acetate, and 3,17-diacetate esters thereof.

The preferred compounds of this invention are those possessing a 17α-chloroethinyl group and, in particular, 17α-chloroethinylestradiol.

The novel steroids of this invention are conveniently prepared from estrone (1,3,5(10)-estratriene-3-ol - 17-one), 16,16-difluoroestrone (16,16-difluoro-1,3,5(10)-estratriene-3β-ol), and their 3-lower alkoxy derivatives, by halogenoethynation of the 17-keto function utilizing techniques similar to those known in the art. Thus, for example, treatment of estrone with lithium chloroacetylide (prepared by the action of methyl lithium on 1,2-dichloroethylene) yields a compound of this invention, 17α-chloroethinylestradiol. In like manner, estrone methyl ether is converted to 17α-chloroethinylestradiol methyl ether.

In similar manner, the action of bromoethinyl lithium on estrone yields 17α-bromoethinylestradiol of this invention.

The starting compounds possessing a 16,16-difluoro moiety, i.e. 16,16-difluoroestrone and the lower alkoxy ethers thereof, are prepared by techniques such as described in U.S. Patent No. 3,048,605. By this process, the action of perchlorylfluoride on 3 - methoxy-16-hydroxymethylene-1,3,5(10)-estratriene-17-one yields the starting compound 16,16-difluoroestrone 3-methyl ether which may be cleaved with hydroiodic acid/acetic acid to the alcohol, 16,16-difluoroestrone. Conversion of the thus prepared 16,16-difluoroestrone and 16,16-difluoroestrone 3-methyl ether to compounds such as 16,16-difluoro-17α-bromoethinylestradiol, 16,16 - difluoro-17α-bromoethinylestradiol 3-methyl ether, 16,16-difluoro-17α-chloroethinylestradiol and 16,16-difluoro-17α-chloroethinylestradiol 3-methyl ether is then effected via the process of this invention as described hereinabove.

The 3-alkyloxy-17α-halogenoethinyl-1,3,5(10)-estratrienes of the general formula possessing an ester group at C–17 are conveniently prepared by known techniques from the corresponding 3-alkoxy-17β-hydroxy-17α-halogenoethinylestratrienes by esterification with pyridine and an acid anhydride. For example, 17α-chloroethinyl-1,3,5 (10)-estratriene-3,17β-diol 3-methyl ether when heated with acetic anhydride in pyridine yields the 17-acetate, i.e. 17α - chloroethinyl-1,3,5(10)-estratriene-3,17β-diol 3-methyl ether 17-acetate. By substituting other lower alkanoic acid anhydrides such as propionic anhydride or caproic anhydride; or a dicarboxylic acid anhydride such as succinic or phthalic anhydride; or acid halides of aryl carboxylic acids such as benzoyl chloride, the corresponding 17-ester is obtained, i.e. the 17-propionate, 17-caproate, 17-succinate, 17-phthalate and 17-benzoate respectively of 17α-chloroethinyl-1,3,5(10)-estratriene-3, 17β-diol 3-methyl ether.

When preparing 3,17-diesters of the general formula, the corresponding 3,17-diol is preferably reacted in pyridine with at least two moles of an acid anhydride or two moles of an acid chloride per mole of steroid. Usually an excess of acid anhydride or acid halide is used, and it is often desirable to apply heat to hasten the esterification process. For example, 16,16-difluoro-17α - chloroethinylestradiol dibenzoate is obtained from the 16,16-difluoro-17α-chloroethinylestradiol by reaction with a 2-molar excess of benzoyl chloride.

The 3 - acyloxy-17α-halogenoethinyl-17β-hydroxyestratrienes of the general formula are conveniently prepared from the corresponding 3,17-dihydroxy-17α-halogenoethinyl estratrienes by selective esterification at C–3 with pyridine and a lower alkanoyl anhydride, or with pyridine and an acid chloride of an aryl carboxylic acid such as benzoyl chloride. For example, 17α-chloroethinyl-1,3, 5(10)-estratriene-3,17β-diol reacted with approximately a molar equivalent of acetic anhydride in pyridine yields the 3-monoacetate, i.e. 17α-chloroethinyl-1,3,5(10)-estratriene-3,17β-diol 3-acetate. Similarly, reaction with approximately a molar equivalent of benzoylchloride in pyridine yields the 3-monobenzoate, i.e. 17α-chloroethinyl-1,3, 5(10)-estratriene-3,17β-diol 3-benzoate.

By varying reaction conditions and utilizing a combination of known techniques there are obtained compounds of the general formula having dissimilar ester groups at C–3 and C–17. For example, reaction of a 3-acyloxy-16,16-difluoro-17α-hydroxyestratriene with an acid anhydride or acid halide having an acid radical other than that at the 3-position, such as the reaction of 17α-chloroethinyl-1,3,5(10)-estratriene-3,17β-diol 3-benzoate with acetic anhydride in pyridine at elevated temperatures will yield the mixed 3,17-diester, 17α-chloroethinyl-1,3,5(10)-estratriene-3,17β-diol 3-benzoate 17-acetate.

A compound of my invention possessing a hydroxy group at C–3 and an ester group at C–17, such as 16,16-difluoro-17α-chloroethinylestradiol 17-acetate and 17α-chloroethinylestradiol 17-acetate are conveniently prepared by known techniques from the corresponding diesters, 16,16-difluoro-17α-chloroethinylestradiol diacetate and 17α-chloroethinyl estradiol diacetate by partial hydrolysis such as with 5% potassium hydroxide or 1% potassium carbonate in methanol respectively.

The compounds of this invention, and particularly 17α-chloroethinylestradiol, possess estrogenic activity and thus are useful in the treatment of ailments such as menopausal disorders, hypogenitalism and sexual infantilism, amenorrhea and oligomenorrhea associated with hypogonadism, postpartum breast engorgement and pruritus or kraurosis vulvae. My compounds are preferably administered orally, a convenient dosage form being tablets containing 0.02 mgm., 0.05 mgm. or 0.5 mgm. of a 17α-chloroethinylestradiol of this invention in admixture with a pharmaceutically acceptable excipient. The dosage of compound used on a patient will vary depending on the nature and severity of the patient's symptoms.

The following examples are for illustrative purposes only and are not to be construed as limiting, the limit of my invention being defined by the appended claims.

EXAMPLE 1

*17α-chloroethinyl-1,3,5(10)-estratriene-3,17β-diol (17α-chloroethinylestradiol)*

To 560 mg. of lithium metal in anhydrous ether (50 ml.) is added dropwise, over 30 minutes, a solution of methyl iodide (2.5 ml.) in ether (15 ml.). The mixture is then left for one hour at room temperature, and is then cooled to 0° C. A solution of 1,2-dichloroethylene (3.1 ml.) in either (20 ml.) is then added dropwise, over 15 minutes, and the mixture is stirred at room temperature for 30 minutes. A solution of estrone (1.15 g.) in tetrahydrofuran (20 ml.) is then added dropwise over 15 minutes, and the mixture is stirred at room temperature for 18 hours. The reaction mixture is then cooled to −60° C. and solid ammonium chloride (5 g.) is added, followed by water. The ether is evaporated, the resulting aqueous suspension is filtered, and the residue on the filter is washed with water, dried, and chromatographed on Florisil. Elution with hexane-ether (9:1) gives a solid which is crystallized from acetone-hexane to give 17α-chloroethinyl-1,3,5(10)-estratriene-3,17β-diol. M.P. 190–191° C., $[\alpha]_D$ −16° (dioxan).

EXAMPLE 2

*17α-chloroethinyl-1,3,5(10)-estratriene-3,17β-diol 3-methyl ether (17α-chloroethinylestradiol 3-methyl ether)*

A solution of estrone 3-methyl ether (1.15 g.) in tetrahydrofuran (20 ml.) is allowed to react with lithium chloroacetylide exactly in the manner of Example 1, and the crude product is chromatographed on Florisil. Elution with hexaneether (9:1) gives a solid which is crystallized from acetonehexane to give 17α-chloroethinyl-1,3,5 (10)-estratriene-3,17β-diol 3-methyl ether. M.P. 165–168° C., $[\alpha]_D$ −13° (dioxan).

EXAMPLE 3

*16,16 - difluoro-17α-chloroethinyl-1,3,5(10)-estratriene-3, 17β-diol 3-methyl ether (16,16-difluoro-17α-chloroethinylestradiol 3-methyl ether)*

16,16-difluoro-1,3,5(10)-estratriene-3-ol-17-one is allowed to react with lithium chloroacetylide (prepared by the action of methyl lithium on 1,2-dichloroethylene) in a manner similar to that described in Example 1. The resultant product is isolated in the described manner to give 16,16 - difluoro-17α-chloroethinyl - 1,3,5(10)-estratriene 3,17β-diol 3-methyl ether.

In a similar manner, 16,16-difluoro-1,3,5(10)-estratriene-3-ol-17-one 3-ethyl ether is allowed to react with lithium chloroacetylide to give 16,16-difluoro-17α-chloroethinyl-1,3,5(10)-estratriene-3,17β-diol 3-ethyl ether.

EXAMPLE 4

*16,16-difluoro-17α-chloroethinyl-1,3,5(10)-estratriene-3, 17β-diol (16,16-difluoro-17α-chloroethinylestradiol)*

In a manner similar to that described in Example 1, 16,16-difluoro-1,3,5(10)-estratriene-3-ol-17-one is allowed to react with lithium chloroacetylide. The resultant product is isolated in the described manner to give 16,16-difluoro - 17α - chloroethinyl - 1,3,5(10) - estratriene - 3, 17β-diol.

EXAMPLE 5

*17α-bromoethinylestradiol, the 3-methyl ether thereof, and the 16,16-difluoro derivatives thereof*

A solution of estrone (1,3,5(10)-estratriene-3-ol-17-one) is treated in the exact manner as described in Example 1 except that instead of 1,2-dichloroethylene (3.1 ml.) there is used 1,2-dibromoethylene (5.94 ml.). The resultant product is isolated in the described manner to give 17α - bromoethinyl-1,3,5(10)-estratriene-3,17β-diol (17α-bromoethinylestradiol).

In a similar manner, estrone 3-methyl ether, 16,16-difluoro estrone, 16,16-difluoro estrone 3-methyl ether, and 16,16-difluoro estrone 3-ethyl ether are each allowed to react with lithium bromoacetylide (prepared by the action of methyl lithium on 1,2-dibromoethylene) and there is obtained, respectively, 17α-bromoethinylestradiol 3-methyl ether, 16,16-difluoro-17α-bromoethinylestradiol, 16,16-difluoro-17α-bromoethinylestradiol 3-methyl ether, and 16,16-difluoro - 17α - bromoethinylestradiol 3-ethyl ether.

EXAMPLE 6

*3-alkoxy-17α-halogenoethinyl-17β-acyloxy-1,3,5(10)-estratrienes*

A. 17-LOWER ALKANOATE ESTERS

To 1 g. of 3-methoxy-17α-chloroethinyl-1,3,5(10)-estratriene-17β-ol (the compound of Example 2) in 10 ml. of pyridine is added 10 ml. of acetic anhydride. The solution is refluxed under an atmosphere of nitrogen until esterification is substantially complete as determined by paper chromatography using dinitrophenylhydrazine as the indicating reagent. The reaction mixture is cooled, poured into water, and extracted with ether. The ether extracts are combined, washed with 5% aqueous sodium bicarbonate solution, then water, dried over sodium sulfate, filtered, then distilled in vacuo to give a residue substantially of 3-methoxy-17α-chloroethinyl-1,3,5(10)-estratriene-17β-ol 17-acetate.

In a similar manner, 3-methoxy-16,16-difluoro-17α-chloroethinyl - 1,3,5(10) - estratriene - 17β - ol, 3-ethoxy-16,16-difluoro-17α-chloroethinyl - 1,3,5(10) - estratriene-17β-ol, 3-methoxy - 17α - bromoethinyl-1,3,5(10)-estratriene-17β-ol, and 3-methoxy - 16,16 - difluoro-17α-bromoethinyl-1,3,5(10)-estratriene-17β-ol are each reacted with acetic anhydride in pyridine in the above-described manner to give, respectively, 3-methoxy-16,16-difluoro-17α-chloroethinyl - 1,3,5(10) - estratriene-17β-ol 17-acetate, 3-ethoxy-16,16-difluoro - 17α - chloroethinyl-1,3,5(10)-estratriene - 17β - ol 17-acetate, 3-methoxy - 17α - bromothinyl-1,3,5(10)-estratriene - 17β - ol 17-acetate, and 3-methoxy - 16,16 - difluoro-17α-bromoethinyl-1,3,5(10)-estratriene-17β-ol 17-acetate.

Similarly, by substituting other lower alkanoic acid anhydrides such as propionic, valeric, or caproic for acetic anhydride in the above procedure, there is obtained the corresponding 17-propionate, 17-valerate and 17-caproate, respectively, of 3-methoxy-16,16-difluoro - 17α - chloroethinyl - 1,3,5(10) - estratriene-17β-ol, 3-ethoxy-16,16-difluoro-17α-chloroethinyl - 1,3,5(10) - estratriene-17β-ol, 3-methoxy - 17α - bromoethinyl - 1,3,5(10) - estratriene-17β-ol, and 3-methoxy-16,16-difluoro - 17α - bromoethinyl-1,3,5(10)-estratriene-17β-ol.

B. 17-HEMISUCCINATE ESTERS AND SODIUM SALTS THEREOF

To 1 g. of 3-methoxy-17α-chloroethinyl-1,3,5(10)-estratriene-17β-ol in 10 ml. of pyridine is added 1 g. of succinic anhydride. The mixture is heated on a steam bath for one hour, then cooled and diluted with water. A solid separates which is filtered, washed with water, and then dried to give 3-methoxy - 17α - chloroethinyl-1,3,5(10)-estratriene-17β-ol 17-hemisuccinate.

To 1 g. of 3-methoxy-17α-chloroethinyl-1,3,5(10)-estratriene-17β-ol 17-hemisuccinate suspended in 10 ml. of water is added 1.0 ml. of a 10% aqueous solution of sodium hydroxide. The resultant aqueous solution is evaporated in vacuo to a residue of substantially 3-methoxy-17α-chloroethinyl - 1,3,5(10) - estratriene - 17β - ol 17-sodium hemisuccinate.

Similarly, in the procedure described hereinabove, by substituting for 3-methoxy-17α-chloroethinyl-1,3,5(10)-estratriene-17β-ol the 3-alkoxy estratrienes prepared in Examples 3 and 5, there is obtained, respectively, the 17-hemisuccinate and 17-sodium hemisuccinate of 3-methoxy-16,16-difluoro-17α-chloroethinyl - 1,3,5(10) - estratriene-17β-ol, 3-ethoxy - 16,16 - difluoro-17α-chloroethinyl-1,3,5(10)-estratriene-17β-ol, 3-methoxy - 17α - bromoethinyl-1,3,5(10)-estratriene-17β-ol, 3-methoxy - 16,16 - difluoro-17α-bromoethinyl - 1,3,5(10) - estratriene-17β-ol and 3-ethoxy - 16,16 - difluoro - 17α - bromoethinyl-1,3,5(10)-estratriene-17β-ol.

C. 3-METHOXY-17α-CHLOROETHINYL-1,3,5(10)-ESTRATRIENE-17β-OL 17-BENZOATE 1 g. of 3-methoxy-17α-chloroethinyl-1,3,5(10)-estratriene-17β-ol in 10 ml. of pyridine and 2 ml. of benzoyl chloride is reacted in a manner similar to that described in Example 6A to give 3-methoxy-17α-chloroethinyl-1,3,5 (10)-estratriene-17β-ol 17-benzoate.

In a similar manner, by substituting the alkoxy estratrienes prepared in Examples 3 and 5 for 3-methoxy-17α-chloroethinyl-1,3,5(10)-estratriene-17β-ol in the above procedure, there is obtained the corresponding 17-benzoate ester.

EXAMPLE 7

*Preparation of 3-acyloxy esters*

A. PREPARATION OF 3-ALKANOYL ESTERS

A solution of 1 g. of 17α-chloroethinyl-1,3,5(10)-estratriene-3,17β-diol in 10 ml. of pyridine and 2 ml. of acetic anhydride is left overnight at room temperature. Water is added and the aqueous mixture extracted with ether. The ether extracts are combined, washed with 2 N hydrochloric acid, then water, dried over sodium sulfate, filtered, and evaporated in vacuo to give a residue substantially of 17α-chloroethinyl - 1,3,5(10) - estratriene-3,17β-diol 3-acetate.

In a similar manner, 16,16-difluoro-17α-chloroethinyl-1,3,5(10) - estratriene - 3,17β - diol, 17α - bromoethinyl-1,3,5(10)-estratriene-3,17β-diol, and 16,16-difluoro-17α-bromoethinyl-1,3,5(10)-estratriene-3,17β-diol are each reacted with acetic anhydride in pyridine to give, respectively, 16,16-difluoro-17α-chloroethinyl - 1,3,5(10) - estratriene-3,17β-diol 3-acetate, 17α-bromoethinyl-1,3,5(10)-estratriene - 3,17β - diol 3-acetate and 16,16-difluoro-17α-bromoethinyl-1,3,5(10)-estratriene-3,17β-diol 3-acetate.

By substituting other acid anhydrides such as propionic, valeric, t-butylacetic anhydride for acetic anhydride in the above procedure, there are obtained the corresponding propionate, valerate, and t-butyl acetate of the aforenamed compounds.

B. PREPARATION OF 3-BENZOATE ESTERS

To 1 g. of 17α-chloroethinyl-1,3,5(10)-estratriene-3,17β-diol in 10 ml. of pyridine is added 3 ml. of benzoyl chloride. The solution is left at room temperature for twenty-four hours; water is added and the aqueous mixture extracted with ether. The ether extracts are combined, washed with 2 N hydrochloric acid, then water, dried over sodium sulfate, filtered and distilled in vacuo to give a residue substantially of 17α-chloroethinyl-1,3,5(10)-estratriene-3,17β-diol 3-benzoate.

In a similar manner, 16,16-difluoro-17α-chloroethinyl-1,3,5(10) - estratriene - 3,17β - diol, 17α - bromoethinyl-1,3,5(10)-estratriene-3,17β-diol, and 16,16-difluoro-17α-bromoethinyl-1,3,5(10)-estratriene-3,17β-diol are each reacted with benzoyl chloride in pyridine to give, respectively, 16,16-difluoro-17α-chloroethinyl-1,3,5(10)-estratriene - 3,17β-diol 3-benzoate, 17α-bromoethinyl-1,3,5(10)-estratriene-3,17β-diol 3-benzoate, and 16,16-difluoro-17α-bromoethinyl-1,3,5(10)-estratriene-3,17β-diol 3-benzoate.

EXAMPLE 8

*Preparation of 3,17-di-lower alkanoyl and 3,17-dibenzoate esters*

1 g. of 17α-chloroethinyl-1,3,5(10)-estratriene-3,17β-diol in 10 ml. of pyridine and 4 ml. of acetic anhydride is reacted in the manner described in Example 6A to give 17α - chloroethinyl - 1,3,5(10) - estratriene-3,17β-diol di-acetate.

1 g. of 17α-chloroethinyl-1,3,5(10)-estratriene-3,17β-diol in 10 ml. of pyridine and 4 ml. of benzoyl chloride is reacted in a manner similar to that described in Example 6C to give 17α-chloroethinyl-1,3,5(10)-estratrene-3,7β-diol dibenzoate.

In a similar manner, 17α-bromoethinyl-1,3,5(10)-estratriene - 3,17β-diol, 16,16-*d*ifluoro-17α-chloroethinyl-1,3,5-(10)-estratriene-3,17β-diol, and 16,16-difluoro-17α-bromoethinyl-1,3,5(10)-estratriene-3,17β-diol are each reacted with acetic anhydride or benzoyl chloride to give the respective di-esters, i.e.

17α-bromoethinyl-1,3,5(10)-estratriene-3,17β-diol diacetate,
17α-bromoethinyl-1,3,5(10)-estratriene-3,17β-diol dibenzoate,
16,16-difluoro-17α-chloroethinyl-1,3,5(10)-estratriene-3,17β-diol diacetate,
16,16-difluoro-17α-chloroethinyl-1,3,5(10)-estratriene-3,17β-diol dibenzoate,
16,16-difluoro-17α-bromoethinyl-1,3,5(10)-estratriene-3,17β-diol diacetate, and
16,16-difluoro-17α-bromoethinyl-1,3,5(10)-estratriene-3,17β-diol dibenzoate.

I claim:
1. A compound selected from the group consisting of a 17α-halogenoethinylestradiol of the following general formula:

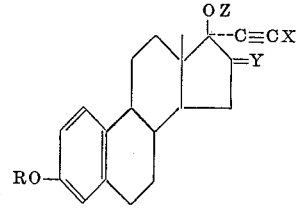

wherein R is a member selected from the group consisting of H, lower alkyl, and an acid residue of a hydrocarbon carboxylic acid having up to 8 carbon atoms; Z is a member selected from the group consisting of H and an acid residue of a hydrocarbon carboxylic acid having up to 8 carbon atoms; X is a halogen having an atomic weight greater than 19 and less than 100; and Y is a member selected from the group consisting of

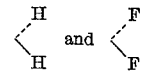

2. 17α-chloroethinylestradiol.
3. 16,16-difluoro-17α-chloroethinylestradiol.
4. 17α-bromoethinylestradiol.
5. 16,16-difluoro-17α-bromoethinylestradiol.
6. 17α-chloroethinylestradiol 3-methyl ether.
7. 17α-bromoethinylestradiol 3-methyl ether.
8. 16,16 - difluoro-17α-chloroethinylestradiol 3-methyl ether.
9. 16,16 - difluoro - 17α-bromoethinylestradiol 3-methyl ether.
10. 3 - OR-17α-chloroethinyl-1,3,5(10)-estratriene-17β-ol wherein R is an acid residue of a carboxylic acid having up to 8 carbon atoms.
11. 17α-chloroethinylestradiol 3-acetate.
12. 17α-chloroethinylestradiol 3-benzoate.
13. 17α-chloroethinylestradiol diacetate.
14. 17α-chloroethinylestradiol 3-methyl ether 17-acetate.
15. 17α-chloroethinylestradiol 3-methyl ether 17-hemisuccinate.
16. In the process of preparing a compound selected from the group consisting of steroids of the following general formula:

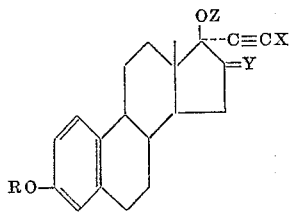

wherein R is a member selected from the group consisting of H, lower alkyl, and an acid residue of a hydrocarbon carboxylic acid having up to 8 carbon atoms; Z is a member selected from the group consisting of H and an acid residue of a hydrocarbon carboxylic acid having up to 8 carbon atoms; X is a halogen having an atomic weight greater than 19 and less than 100; Y is a member selected from the group consisting of

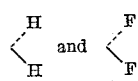

the step which comprises reacting a member selected from the group consisting of a compound of the following general formula:

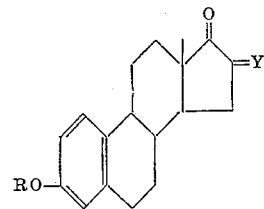

wherein R and Y are as hereinabove defined; with a reactant selected from the group consisting of lithium chloroacetylide and lithium bromoacetylide.

17. The process which comprises reacting estrone with lithium chloroacetylide.

18. A compound of the following formula

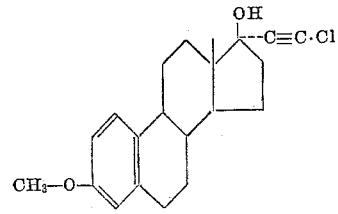

19. A compound of the following formula:

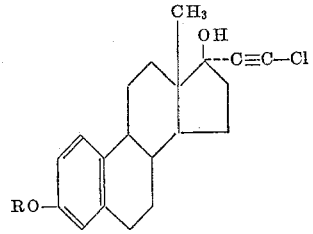

wherein R is a member selected from the group consisting of hydrogen and methyl.

References Cited

UNITED STATES PATENTS 3,057,885  10/1962  Goldkamp _____ 260—397.4
3,062,845  11/1962  Mills et al. _____ 260—397.4

OTHER REFERENCES

Fried et al., "Journal Amer. Chem. Soc." vol. 83 (1961), pp. 4663–4664 relied on.

Robinson et al., "Journal Amer. Chem. Soc.," vol. 82 (1960), pp. 5256–5257 relied on.

ELBERT L. ROBERTS, Primary Examiner.

LEWIS GOTTS, Examiner.